Aug. 7, 1945.    A. VON WANGENHEIM    2,381,146
WATER MIXING VALVE
Filed Dec. 7, 1942    2 Sheets-Sheet 1
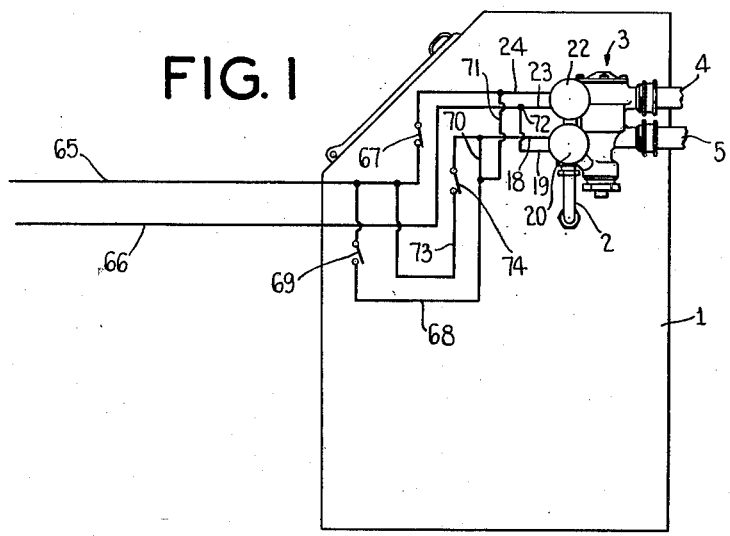
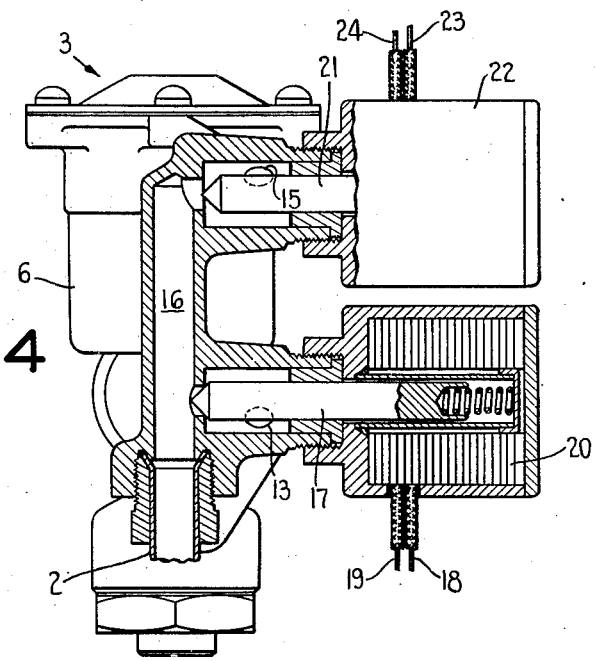
INVENTOR
Adolf Von Wangenheim
BY Andrew K. Foueda
his ATTORNEY

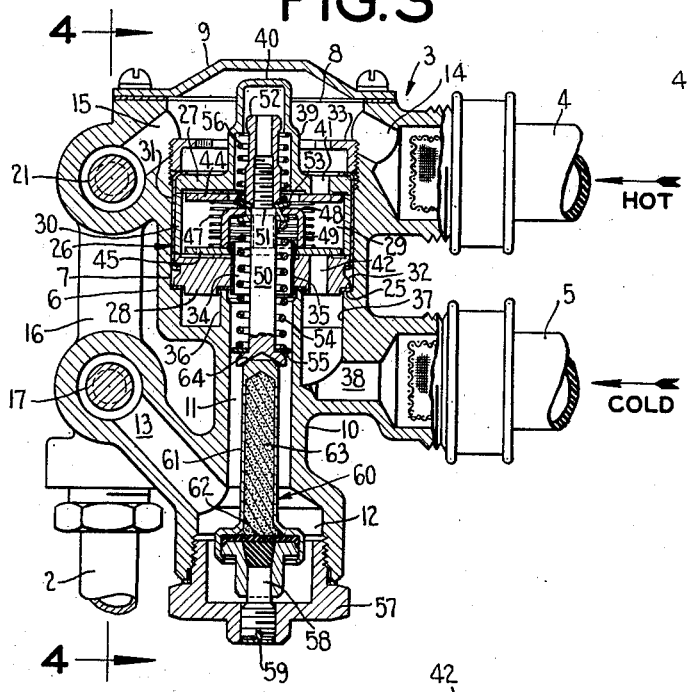

Patented Aug. 7, 1945

2,381,146

UNITED STATES PATENT OFFICE 2,381,146

WATER MIXING VALVE

Adolf von Wangenheim, Detroit, Mich., assignor to Detroit Lubricator Company, Detroit, Mich., a corporation of Michigan Application December 7, 1942, Serial No. 468,038

17 Claims. (Cl. 236—12)

This invention relates to new and useful improvements in valves for controlling the mixing proportions of two fluid streams and more particularly to valves for regulating the temperature of a mixed stream of fluid.

An object of the invention is to provide a mixing valve of novel and simple construction which can be readily assembled in commercial production.

Another object is to provide a mixing valve which is particularly adapted for automatic control in supplying water to a washing machine or the like.

Another object is to provide a valve unit containing the fluid mixing chamber and which is readily removable bodily from the conduit-containing housing structure.

The invention consists in the improved construction and combination of parts to be more fully described hereinafter and the novelty of which will be particularly pointed out and distinctly claimed.

In the accompanying drawings to be taken as a part of this specification, there is fully and clearly illustrated a preferred embodiment of the invention, in which drawings:

Figure 1 is a view in side elevation of a washing machine or the like showing the mixing valve of this invention in cooperative relation thereto and showing the electrical circuit arrangement for controlling the operation of the mixing valve;

Fig. 2 is a bottom plan view of the mixing valve;

Fig. 3 is a view of the valve in section on the line 3—3 of Fig. 2;

Fig. 4 is a view in section on the line 4—4 of Fig. 3 but showing the solenoid valve coils in operative position;

Fig. 5 is a view in side elevation of the valve unit which contains the mixing chamber;

Fig. 6 is a top plan view of the valve unit;

Fig. 7 is a detail plan view of one of the valve unit or mixing chamber end plates;

Fig. 8 is a detail plan view of a valve limiting or abutment member;

Fig. 9 is a detail plan view of one of the mixing chamber valve members, and

Fig. 10 is a detail plan view of a spring supporting member.

Referring to the drawings by characters of reference, the numeral 1 designates generally a washing machine casing, for example, containing a tub, not shown, to be supplied with water by the discharge pipe 2 leading from the mixing valve 3. A hot water supply conduit 4 and a cold water supply conduit 5 are connected to the mixing valve 3 and may be provided with manual control or shut off valves, not shown. The valve 3 includes a main body or housing member 6 having a substantially cylindrical chamber 7 with an open end 8 closed and sealed by a cover member 9. Projecting from the chamber 7, there is a hollow extension 10 having a duct portion or passageway 11, alined with and concentrically connecting the chamber 7 with an outflow chamber 12 carried by the extension 10. Leading from the chamber 12, there is an outlet conduit 13. The inlet conduit 4 is coupled and communicatively connected to an inlet conduit 14 which opens into the chamber 7 adjacent the open end 8. Leading from the chamber 7, adjacent the open end 8, and from the side thereof opposite the conduit 14, there is a hot water outlet conduit 15. The outlet conduits 13 and 15 open into a discharge conduit 16 which is connected to the discharge pipe 2. Communication between the conduits 13 and 16 is controlled by a remotely controlled shut off valve 17, such as a solenoid valve having coil lead wires 18, 19 and which is normally urged to closed position when the solenoid coil 20 is deenergized. Communication between conduits 15 and 16 is likewise controlled by a remotely controlled shut off valve 21 which is operated by a solenoid coil 22 having lead wires 23, 24, this solenoid valve being shown in open energized position.

Within the chamber 7 and seating at its bottom marginal edge on an annular inward projecting shoulder 25, there is a hollow cylindrical valve unit 26 in the form of a tubular casing having end plates 27, 28 forming the end walls of the mixing chamber 29. The plates 27, 28 are separated from each other by a tubular spacer member 30 which is clamped between the plates 27, 28 by a tubular binding sleeve 31 which fits within the chamber 7. The sleeve 31 has one end turned or bent inward into a circumferential groove 32 in the end plate 28 and has its other end turned or bent over the outer end of the end plate 27, so that the valve unit is rigidly clamped together. A sleeve nut 33 is screw threaded into the chamber 7 and bears against one end of the valve unit 26 to hold it tightly against the shoulder 25, a sealing washer preferably being carried by the shoulder. The end plate 28 is annular and has a central aperture 34 therethrough in which there is rigidly secured a tubular baffle member or sleeve 35 which projects into the mixing chamber 29. The end plate 28 has a recess in its outer or bottom end face, the recess containing a sealing washer and surrounding the baffle member 35.

This recess receives in sealing engagement the top end portion of a tubular extension 36 of the duct portion 11. The extension 36 therefore provides with the chamber 7 an annular inlet chamber 37 communicating with and fed by an inlet conduit 38 which is communicatively coupled to the cold water inlet conduit 5.

The end plate 27 has a central tubular extension 39 closed at its outer end, as at 40, and providing a central recess opening into the mixing chamber 29. Through the plate 27 there are a plurality of valve ports 41, see Fig. 6, which are preferably equally spaced from each other and each of which is provided within the chamber 29 with a surrounding valve seat bead. Through the end of plate 28 there are a plurality of valve ports 42, see Fig. 7, each being surrounded within the chamber 29 by a valve seat bead 43. The ports 42 are preferably spaced laterally outward from the plate opening 34 and equidistant from each other. Within the chamber 29 there is a pair of annular valve plate or disk members 44, 45 which are of identical construction, see Fig. 9, each having a plurality of radial fingers or ears 46 for guiding the valve plates within the sleeve 30 and providing circumferential annular recesses so that liquid passing through the ports 41, 42 can have access to the chamber 29. Positioned between the valve plates 44, 45 there is a helical coil spring 47 which has its ends seating against the valve plates 44, 45 and which urges the valve plates into closing engagement with the seat beads of their respective ports. Also positioned between the valve plates 44, 45 there is an abutment member in the form of a spider having an annular flange or base portion 48 and longitudinal spaced fingers 49 which seat on and limit the extent of movement of the valve plate 45. The disk portion 48 is engageable with and is positioned to limit the opening movement of the valve plate 44. Slidably fitting in a bushing which seats in the apertured abutment member base portion 48 there is a thrust member 50 having a circumferential shoulder 51 on which there is seated and clamped by a guide stem 52, an annular flange or washer 53. The abutment member base portion 48 is urged toward and normally held against the flange 53 by a helical coil spring 54 which surrounds the thrust member 50 within the duct portion 11 and which seats at its lower end on a spring seat and guide member 55 in the form of a spider, see Fig. 10, the member 55 seating on an annular shoulder on the end portion of the thrust member 50. The abutment member fingers 49 are urged toward and normally seat the valve plate 45 on the end plate 28 under the force of a helical coil spring 56 which is positioned within the recess of the end wall extension 39, one end of this spring 56 seating against a shoulder in the extension 39 and the other end of the spring 56 seating on the flange 53.

The outflow chamber 12 is closed at its outer end by a cup-like cap member 57 which carries a guide and supporting member 58 which is adjustably screw-threaded therein and which extends into the chamber 12 concentric with the passageway 11 and in line with the thrust member 50. The adjustment of the member 58 is for factory setting to permit commercial quantity production, this adjustment being solder-sealed as at 59 to prevent change in the adjusted setting. Supported and guided upon the member 58, there is a rigid temperature responsive or thermostatic device 60 having a hollow tubular force transmitting member or plunger 61, the bore of which is closed by a resilient flexible diaphragm member 62, thereby providing an expansible, contractible chamber. This chamber is filled with a temperature responsive medium which may be a material such as wax. The upper or free end portion of the plunger 61 is preferably of truncated conical form to fit cooperatively within a conical recess in the end portion of the thrust member 50, as at 64.

The valve 3 and the supply of liquid to the machine 1 is electrically controlled by means of the solenoid coils 20, 22 supplied with current from the lead wires 65, 66. The lead wire 66 may be considered as the "hot" wire and connects through a switch 67 to the lead wire 24 of the coil 22. The lead wire 23 from the coil 22 is connected to the other lead wire 66. From the wire 65 a lead wire 68 having a switch 69 therein connects to two branch wires 70, 71 connected respectively to the lead wire 18 of coil 20 and to the lead wire 24. The lead wire 19 of coil 20 is connected, as at 72, to the wire 66. Also leading from the wire 65 there is a lead wire 73 having a switch 74 therein and which is connected to the lead wire 18.

The operation of the mixing valve, assuming that there is a source of hot water supply connected to the conduit 4, is as follows. The washing machine operator has closed switch 67, while leaving switches 69 and 74 open so that the solenoid coil 22 is energized and the coil 20 is deenergized. The result is that valve 21 is open, as shown in Fig. 4, and accordingly hot water alone will be supplied through the discharge pipe 2 into the tub of the machine 1. This hot water supplied from conduit 4 will flow through conduit 14 into the end portion of chamber 7, and across the top of the valve unit 26 to the outlet conduit 15 and thence through the open solenoid valve into the discharge conduit 16 and thence to the machine. The valve 17, of course, is closed and therefore there will be no flow through the outlet conduit 13 from the thermostatic outflow chamber 12 or through the valve unit 26. Therefore, hot water alone uncontrolled as to temperature will be supplied to the machine. If now it is desired to supply a greater volume of water to the machine 1 without temperature regulation of the supply water, then the switch 74 is closed, or, if switches 67 and 74 are both open, the switch 69 is closed, that is, closure of either both the switches 67 and 74 or of the switch 69 will cause both of the solenoid coils 20 and 22 to be energized and the solenoid valves 17 and 21 to be open. With the valves 17 and 21 both open, the pressure of the hot water supply acting against the valve plate 44 will move this plate downward or inward against the force of the spring 47 so that hot water will flow through the valve ports 41 into the chamber 29 and thence through the end wall opening 34, the passageway 11 around the temperature responsive element 60 and thence through outlet conduit 13 to the discharge conduit 16. The hot water passing over or around the element 60 will cause it to expand, thereby pushing upward on the thrust member 50 so that the abutment fingers 49 are lifted which will permit the pressure of the water in the cold water inlet 5 and chamber 37 to push upward on the valve plate 45 for flow of cold water into the mixing chamber 29. The cold water admitted through the ports 42 will be required to flow laterally outward away from the wall opening 34 by reason of the baffle 35 so that there will be an intimate mixing in the chamber 29 of the hot water from ports 41 and the cold water from the ports 42 before this mixed water can pass through the opening 34 and enter the passageway 11 to affect the response of the thermostatic element 60. It will therefore be apparent that the volume of water supplied to the machine from the discharge pipe 2 will be increased when both of the valves 17 and 21 are open. If now it is desired to supply water at a controlled maximum temperature to the machine 1, then valve 21 is closed and valve 17 is opened, which is accomplished by closing the switch 74 and opening the switches 67 and 69. The result will be that no hot water can by-pass the valve unit 26 through the outlet conduit 15 and all of the hot water must pass through the mixing valve unit 26. Assuming that the thermostatic means 60 is cold and that this valve 17 has just been opened, the valve 21, of course, having been closed, then the pressure of the hot water acting on the valve plate 44 through the inlet ports 41 will, as above described, compress the spring 47 so that hot water will enter the mixing chamber 29 both around the outer periphery of the valve plate 44 and also through the central aperture thereof. This hot water will discharge from the mixing chamber 29 downward through the wall opening 34 and through the passageway 11 and the outlet conduit 13 to the discharge pipe 2, the hot water causing expansion of the temperature responsive material 63. Until the thrust member 50 is moved upward by expansion of the material 63, the valve plate 45 will be held closed under the force of the springs 47 and 56 and of the hot water in chamber 29, so that no cold water can enter the mixing chamber 29 through the ports 42. It may be noted that the spring 56 needs only to exert sufficient force properly to return the thrust member 50 upon contraction of the thermal element 60. Initial upward movement of the thrust member 50, as the force exerted by the material 63 overcomes the spring 56, will permit the pressure of the cold water to move the valve plate 45 upwardly with the upward movement of the abutment fingers 49 for flow of cold water into the mixing chamber 29 around the outer periphery of the valve plate 45, as above described. This cold water will mix with and temper the hot water admitted to chamber 29 and the mixed water will then discharge through the opening 34 and passageway 11. Should the water pressure in the chamber 29, taking into account the pressure drop through ports 41 and 42, exceed the pressure in either the inlet conduit 14 or 38, then the valve plate 44 or 45, as the case may be, will act as a check valve preventing flow of the hot water into the cold water inlet conduit or vice versa. This function of the valve plates 44 and 45 acting as check valves is particularly important and advantageous if either the conduit 4 or 5 should be detached from the mixing valve or if during a stand-by period when both of the solenoid valves 17 and 21 are closed the water pressure or supply to the inlet conduits 14 and 38 is not cut off. If the temperature of the mixed water is above the setting of the thermostatic means 60, which is preferably adjusted to provide a mixed water temperature of say 100° F., the material 63 will continue to expand, thereby further lifting the fingers 49 for consequent further opening of the valve plate 45. The abutment member end portion 48 limits the extent of opening movement of the hot water valve plate 44 and as the thermostatic means 60 expands and moves the base portion 48 upward or toward the plate 44, it will increasingly limit the extent of opening movement of the valve plate 44 and will move this valve plate toward closed position. As the extent of permitted opening of the valve plate 44 is decreased by the abutment member, the extent to which the valve plate 45 can open is simultaneously and proportionately increased. Should the thermostatic means 60 have its temperature increased to a point beyond that at which the abutment member base portion 48 acts to seat the valve plate 44, then the thrust member 50 can have continued upward movement against the resisting force of the lost motion spring 54 so that the parts of the mixing valve will not be injured by excessive expansion of the material 63. It will be apparent from the foregoing that the abutment member base portion 48 and the fingers 49 will variably throttle the supply of hot and cold water respectively to the mixing chamber 29 in accordance with the temperature of the mixed water which flows over or around the thermostatic means 60 and accordingly the temperature of the water flowing through the outlet conduit 13 and the open valve 17 will be maintained substantially constant at the temperature setting of the thermostatic means 60.

What is claimed and is desired to be secured by Letters Patent of the United States is:

1. A mixing valve comprising, a housing member having end walls and having a chamber with end walls spaced from said housing member end walls, a pair of inlet conduits leading into said housing member for communication with said chamber through said chamber end walls, an outlet conduit leading from said chamber, said chamber end walls having inlet ports, a fluid pressure opened valve member controlling admission of fluid from one of said inlet conduits through one of said ports to said chamber, resilient means tending to hold said valve member closed, a fluid pressure opened valve member controlling admission of fluid from the other of said inlet conduits through an opposite one of said ports to said chamber, thermostatic means responsive to the temperature of the mixed fluids, resilient means tending to hold said second-named valve member closed, said thermostatic means being operable upon temperature increase to overcome said second-named resilient means for opening of said second-named valve member, and means operable by said thermostatic means to limit in accordance with temperature the extent of opening movement of said first-named valve member.

2. A mixing valve comprising, a housing member having a chamber, a pair of inlet conduits leading to said chamber, a pair of outlet conduits leading from said chamber, a valve unit in said chamber and separating said inlet conduits from each other and separating said outlet conduits from each other, said unit also separating one of said outlet conduits from both of said inlet conduits and separating the other of said outlet conduits from one only of said inlet conduits, said unit having an outlet opening registering with said one outlet conduit and having a pair of pressure operated valves, one actuated by the fluid pressure in one of said inlet conduits and the other actuated by the fluid pressure in the other of said inlet conduits, and thermostatic means responsive to the temperature of the fluid discharging through said one outlet conduit and operable to regulate the positions of said valves.

3. A mixing valve comprising, a housing member having a chamber, an outlet conduit having a duct portion leading from and projecting into one end of said chamber, a hollow valve unit in said chamber and seating on the end of said duct portion within said chamber, said unit having an outlet opening registering with said duct portion for flow from the interior of said unit, a pair of inlet conduits leading to said chamber at the opposite ends of said unit, an outlet conduit from the other end of said chamber, a shut-off valve for said last-named conduit, fluid pressure responsive valve members within said unit and controlling flow thereinto from said inlet conduits, and thermostatic means operable to regulate the positions of said valve members.

4. A mixing valve comprising, a housing member having a chamber, an outlet conduit having a duct portion leading from and projecting into one end of said chamber, a hollow valve unit in said chamber and seating on the end of said duct portion within said chamber, said valve unit having an outlet opening registering with said duct portion, a pair of inlet conduits leading to said chamber at the opposite ends of said unit, an outlet conduit from the other end of said chamber, a shut-off valve for said last-named conduit, fluid pressure responsive valve members within said unit and controlling flow thereinto from said inlet conduits, thermostatic means within said duct portion, a movable abutment member determining the extent of the opening movement of and positioned between said valve members, means operatively connecting said thermostatic means and said abutment member, and a spring positioned between and tending to close said valve members.

5. A mixing valve comprising, a housing member having a cylindrical chamber with an open end, an inlet conduit and an outlet conduit opening laterally into said chamber adjacent said open end, a closure member for said open end, an outlet conduit having a duct portion leading from and extending concentrically into the other end of said chamber, an inlet conduit leading into said other chamber end, a hollow cylindrical valve unit fitting within said chamber and separating said inlet conduits from each other, said unit having a pair of spaced end plates, one of said end plates having a central aperture and seating at its inner periphery on said duct portion, a pair of annular valve plates in said unit and cooperable with said end plates, the other of said end plates having a central recess opening into said unit, said end plates each having a valve port controlled by its valve plate, a helical coil spring positioned between and urging said valve plates toward port closing position, a thrust member within said duct portion and extending into said unit, an abutment member slidable on said thrust member and positioned between said valve plates, a helical coil lost-motion spring having one end seating on said thrust member and having its other end acting against said abutment member, a helical coil spring in said recess and acting against said thrust member, means on said thrust member engageable with said abutment member and limiting movement of said thrust member relative to said abutment member under the force of said lost-motion spring, and a rigid temperature responsive member positioned in said second-named outlet conduit and having an end portion engageable with said thrust member thereby to overcome said third-named coil spring.

6. A mixing valve comprising, a housing member having a cylindrical chamber with an open end, an inlet conduit and an outlet conduit opening laterally into said chamber adjacent said open end, a closure member for said open end, an outlet conduit having a duct portion leading from and extending concentrically into the other end of said chamber, an inlet conduit leading into said other chamber end, a hollow cylindrical valve unit fitting within said chamber and separating said inlet conduits from each other, said unit having a pair of spaced end plates, one of said end plates having a central aperture and seating at its inner periphery on said duct portion, a pair of fluid pressure actuated annular valve plates in said unit and cooperable with said end plates, the other of said end plates having a central recess opening into said unit, said end plates each having a valve port controlled by its valve plate, a helical coil spring positioned between and urging said valve plates toward port closing position, a thrust member within said duct portion and extending into said unit and through the central opening in each valve plate, an abutment member slidable on said thrust member and positioned between said valve plates, said abutment member being positioned within said coil spring and having a finger extending longitudinally of said thrust member and engaging one of said valve plates, a lateral flange on said thrust member engaging said abutment member, a helical coil lost-motion spring having one end seating on said thrust member and having its other end acting against said abutment member to hold said abutment member against said flange, a helical coil spring in said recess and acting against said flange to urge said abutment member toward its finger engaging valve plate, said flange limiting movement of said thrust member relative to said abutment member under the force of said lost-motion spring, a rigid temperature responsive member positioned in said second-named outlet conduit and having an end portion engageable with said thrust member thereby to overcome said third-named coil spring, said lost-motion spring acting to move said abutment member away from said finger engaging plate upon movement of said flange by said responsive member, and a sleeve secured in said one end plate and extending through the valve plate for said one end plate so as to aid in the mixing of the fluids within said valve unit.

7. In a mixing valve having a housing, a valve structure removable as a unit from said housing and comprising a tubular spacer member, an end plate seating on said member and having a central tubular extension closed at its outer end and opening at its inner end into said spacer member, said end plate having a port therethrough, an annular valve plate guided in said spacer member and operable to close said port, an annular end plate seating on the other end of said spacer member and having a port therethrough, an annular valve plate guided in said spacer member and operable to close the port in said annular end plate, a thrust member extending into said unit and through the central openings of said annular plates and terminating in said tubular extension, and means within said unit and carried by said thrust member and operable to control the operation of said valve plates.

8. In a mixing valve having a housing, a valve structure removable as a unit from said housing and comprising a tubular spacer member, an end plate seating on said member and having a central tubular extension closed at its outer end and opening at its inner end into said spacer member, said end plate having a port therethrough, an annular valve plate guided in said spacer member and operable to close said port, an annular end plate seating on the other end of said spacer member and having a port therethrough and a circumferential groove, an annular valve plate guided in said spacer member and operable to close the port in said annular end plate, a thrust member extending into said unit and through the central openings of said annular plates and terminating in said tubular extension, means within said unit and carried by said thrust member and operable to control the operation of said valve plates, and a tubular binding member sleeved over said spacer member and having one end turned into said groove and having its other end turned over said first-named end plate.

9. In a mixing valve, a tubular casing having end walls, an inflow port through one of said walls, the other of said walls having a central outflow aperture and an inlet valve port, a valve plate in said casing and controlling said inflow port, an annular valve plate controlling flow through said inlet valve port and having its central opening registering with said outflow aperture, and a helical coil spring within said casing and positioned between and urging said valve plates toward port closing position.

10. In a mixing valve, a tubular casing having end walls, an inflow port through one of said walls, the other of said walls having a central aperture and a valve port, a valve plate in said casing and controlling said inflow port, an annular valve plate controlling flow through said valve port and having its central opening registering with said aperture, a helical coil spring within said casing and positioned between and urging said valve plates toward port closing position, and a tubular member secured in said central opening and extending through the central opening in said annular valve plate so as to aid the mixing of fluids entering said casing through said ports.

11. In a mixing valve, a tubular casing having end walls, an inflow port through one of said walls, the other of said walls having a central outflow aperture and an inlet valve port, a valve plate in said casing and controlling said inflow port, an annular valve plate controlling flow through said inlet valve port and having its central opening registering with said outflow aperture, and means positioned between and determining the extent of opening movement of said valve plates.

12. In a mixing valve, a tubular casing having end walls, an inflow port through one of said walls, the other of said walls having a central aperture and a valve port, a valve plate in said casing and controlling said inflow port, an annular valve plate controlling flow through said valve port and having its central opening registering with said aperture, an abutment member having an aperture and being positioned between and engageable with said valve plates, a thrust member extending through and slidable in said abutment member aperture, and means holding said abutment member in operative relation to said thrust member.

13. In a mixing valve, a tubular casing having end walls, an inflow port through one of said walls, the other of said walls having a central aperture and a valve port, a valve plate in said casing and controlling said inflow port, an annular valve plate controlling flow through said valve port and having its central opening registering with said aperture, an abutment member having an aperture and being positioned between and engageable with said valve plates, a thrust member extending through and slidable in said abutment member aperture, a spring carried by said thrust member and tending to slide said thrust member through said abutment member aperture, and means on said thrust member engageable with said abutment member to limit movement of said thrust member by said spring.

14. In a mixing valve, a tubular casing having end walls, an inflow port through one of said walls, the other of said walls having a central aperture and a valve port, a valve plate in said casing and controlling said inflow port, an annular valve plate controlling flow through said valve port and having its central opening registering with said aperture, an abutment member having an aperture and being positioned between and engageable with said valve plates, a thrust member extending through and slidable in said abutment member aperture, spring means between and urging said valve plates toward port closing position, and means holding said abutment member in operative relation to said thrust member.

15. A mixing valve comprising a housing member having a mixing chamber and a outflow chamber and having a passageway alined with and communicatively connecting said chambers in concentric relation, said mixing chamber having end walls, each of said walls having an inlet valve port, a fluid pressure responsive valve member in said mixing chamber controlling flow thereinto through one of said ports, a second fluid pressure responsive valve member in said mixing chamber and controlling flow thereinto through the other of said ports, an inlet conduit leading to the port controlled by said first-named valve member, an inlet conduit leading to the port controlled by said second valve member, temperature responsive means supported in said outflow chamber, means in said mixing chamber controlling the extent of opening movement of said valve members by fluid pressure, means in said passageway operatively connecting said temperature responsive means to said controlling means, and a mixture outlet conduit leading from said outflow chamber.

16. A mixing valve comprising a housing member having a mixing chamber and an outflow chamber and having a passageway alined with and communicatively connecting said chambers in concentric relation, said mixing chamber having end walls, each of said walls having an inlet valve port, a fluid pressure responsive valve member in said mixing chamber controlling flow thereinto through one of said ports, a second fluid pressure responsive valve member in said mixing chamber and controlling flow thereinto through the other of said ports, a hot water inlet conduit leading to the port controlled by said first-named valve member, a cold water inlet conduit leading to the port controlled by said second valve member, a hot water outlet conduit communicating with the inlet side of the port controlled by said first-named valve member, temperature responsive means supported in said outflow chamber, means in said mixing chamber controlling the extent of opening movement of said valve members by fluid pressure, means in said passageway operatively connecting said temperature responsive means to said controlling means, a mixture outlet conduit leading from said outflow chamber, a discharge conduit communicating with both of said outlet conduits, a remotely controlled valve to open or close communication between said hot water outlet conduit and said discharge conduit, and a remotely controlled valve to open or close communication between said mixture outlet conduit and said discharge conduit.

17. A mixing valve comprising a housing member having end walls, a mixing chamber within said housing member and having end walls spaced from said housing member end walls, one of said housing member end walls having both an inlet conduit and an outlet conduit opening therethrough, said outlet conduit having a tubular extension opening through the adjacent end wall of said mixing chamber for flow from said mixing chamber, said housing member having an inlet conduit leading to and an outlet conduit leading from the space between the other end walls of said housing member and said mixing chamber, a discharge conduit communicating with and for receiving fluid from both of said outlet conduits, a remotely controlled valve in said first-named outlet conduit, said mixing chamber end walls having valve ports, valve members within said mixing chamber and controlling flow thereinto through said ports, temperature responsive means in said first-named outlet conduit, means within said mixing chamber operable to regulate the opening movement of said valve members and operatively connected to said responsive means, and a remotely controlled valve in said second-named outlet conduit.

ADOLF von WANGENHEIM.